United States Patent Office 2,828,299
Patented Mar. 25, 1958

2,828,299
BLOWING AGENTS

William H. von Glahn, Loudonville, N. Y., and Bernard Rudner, Baltimore, Md., assignors to General Aniline & Film Corporation, New York, N. Y., a corporation of Delaware No Drawing. Application December 30, 1955
Serial No. 556,428
10 Claims. (Cl. 260—140)

This invention relates to novel chemical compounds and, more particularly, is concerned with compounds containing both a diazoimine grouping and either an acylazide group or an acyl hydrazide group.

The compounds of the type embodied in this invention are relatively stable at normal temperatures, but may be decomposed, with evolution of nitrogen gas, at elevated temperatures; and are, thus, of interest as "blowing" agents for the production of foamed resins or in explosives, particularly as explosion initiators. These novel compounds may be represented by the following general formula:

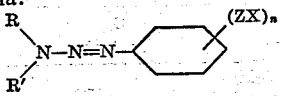

wherein R and R' represent lower alkyl groups, or together form a heterocyclic ring; Z represents a —CO— or —SO$_2$— group; X represents a hydrazino (—NHNH$_2$) or triazo

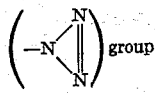group n represents 1 or 2.

The combination in a single molecule of both a diazoimine grouping and, either an acyl azide or an acyl hydrazide group, as has been done in the compounds of this invention, is believed to constitute a novel concept of chemical compounds of special value for use as "blowing" agents for rubber and the like, or in explosives (particularly, as explosion initiators) in the case of compounds containing an acyl azide group. While the combination of these two types of groups in a single compound is novel, the groups themselves are well-known in the art as is the synthesis of the compounds containing only one of these groups.

It has been found that the novel compounds, embodied in the concept of the present invention, can be prepared by suitably combining methods for preparing aromatic compounds containing diazoimine groups and methods for preparing aromatic compounds containing an acyl hydrazide or acyl azide grouping. Complete details of the synthesis of these novel compounds are given in the specific examples, which form a part of the present specification.

Due to the potentially explosive character of the products of the present invention, suitable precautions should be observed in preparing the novel compounds of the present invention, and in handling and testing the same. Similar precautions are generally applied as are employed in the manufacture of other compounds of explosive nature, such as trinitrotoluene, picric acid, nitroglycerine, etc.

The synthetic procedures which we have found to be feasible for the preparation of these novel compounds are illustrated in the specific examples given below, and may be summarized as follows:

When it is desired to prepare a compound containing a diazoimine grouping and an acyl azide grouping, it has been found feasible to start with an amino substituted aromatic acyl hydrazide and convert in one treatment with sodium nitrite to the diazo aryl acyl azide, followed by stabilization with a secondary amine, either of the lower alkyl, i. e., C$_1$–C$_4$ type, or a heterocyclic amine, i. e., piperidine and morpholine, of the formerly described type.

For the preparation of compounds containing a diazoimine grouping and an acyl hydrazide grouping, the starting material may advantageously be an amino substituted benzene carboxylic acid; and the following method of synthesis employed:

The acyl group is first protected, for example by ester formation; the amine diazotized and stabilized by treatment with a secondary amine of a formerly described type, followed by conversion of the protected acyl group to the acyl hydrazide, as by treating with hydrazide hydrate solution.

For the preparation of compounds containing a diazoimine grouping and a sulfonhydrazide grouping, the starting material may advantageously be an acetamidobenzene sulfonyl chloride and condense this with hydrazine to form the hydrazide; the acetyl group of the amide may then be split off to form the amino grouping and the hydrazide grouping protected by condensation with benzaldehyde. The amine group is then diazotized and the diazo condensed with a secondary amine; the benzaldehyde is then split off to give the desired product.

In order to illustrate the details of the synthesis of the products of the present invention, the following specific examples are given.

EXAMPLE 1

15 g. p-aminobenzhydrazide, 200 cc. water and 35 cc. HCl (36.5% by vol.) are mixed and cooled to 0–5° C. 14 g. sodium nitrite solution (31.5%) is added and the charge stirred for 30 min. Over a period of about 20 minutes the diazo solution is added to a solution at 0–5° C. of 16 g. diethylamine in 100 cc. water. During this addition a slight alkalinity is maintained with sodium carbonate solution. The material is then filtered, washed neutral with cold water and dried at a low temperature, preferably under vacuum. The reaction may be illustrated as follows:

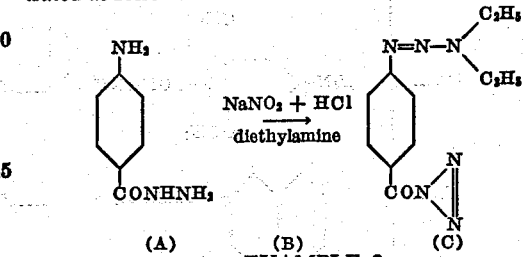

EXAMPLE 2

37.4 g. sulfanilyl hydrazide is dissolved in 200 cc. water and 65 cc. HCl (36.5% by vol.) and the solution cooled to 0° C. 72 cc. sodium nitrite solution (38.5% by vol.) is added beneath the surface. The reaction is maintained for about ½ hour and then added slowly, still at 0–10° C., to a solution of 18.7 g. piperidine in 100 cc. water also at 0° C. A slight alkalinity is maintained with sodium carbonate solution during the addition. After the addition has been made, the charge is maintained, with stirring, for ½ hour, still at 0–10° C. The charge is filtered, washed well with cold water and air dried at room temperature, preferably under a slight vacuum. The reaction follows the general method:

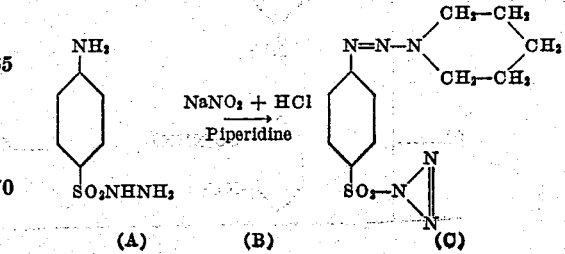

EXAMPLE 3

21 g. 3-aminophthalic acid dihydrazide, 200 cc. water and 51 cc. HCl (36.5 % by vol.) are mixed and cooled to 0–5° C. 21 g. sodium nitrite solution (31.5%) is added and the charge stirred for 30 min. Over a period of about 20 minutes the diazo solution is added to a solution at 0–5° C. of 16 g. diethylamine in 100 cc. water. During this addition a slight alkalinity is maintained with sodium carbonate solution. The material is then filtered, washed neutral with cold water and dried at a low temperature, preferably under slight vacuum. The reaction may be illustrated as follows:

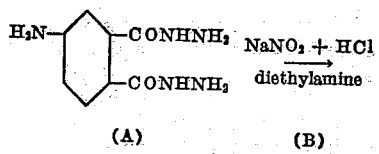

(A)            (B)

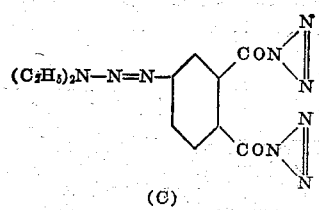

(C)

It is to be understood that the methods described in the foregoing examples are typical of the method for producing compounds of the present invention which contain a diazoimine grouping, and an acylazide grouping. There are illustrated below, in tabular form (Table I), a number of other products of this type, C in the table, which may be prepared by the processes described in detail in the foregoing examples, using, in place of the aminobenzhydrazide of Example 1, or the sulfanilyl hydrazide of Example 2, other amino substituted acyl hydrazides, illustrated under A, in the table, and/or other secondary aliphatic or heterocyclic amines illustrated under B, in the table, in place of the diethylamine of Example 1 or piperidine of Example 2.

*Table I*

| | A Aminoarylhydrazide | B Amine | C Product |
|---|---|---|---|
| (a) | H₂N—⟨⟩—CONHNH₂ | Ethyl ethanol amine | (C₂H₅)(HOC₂H₄)N—N=N—⟨⟩—CON(N₂) |
| (b) | ⟨⟩(NH₂)—CONHNH₂ | Morpholine | O(C₂H₄)₂N—N=N—⟨⟩—CON(N₂) |
| (c) | ⟨⟩(NH₂)—CONHNH₂ | Dipropylamine | (C₃H₇)₂N—N=N—⟨⟩—CON(N₂) |
| (d) | H₂N—⟨⟩(CH₃)—CONHNH₂ | Diethylamine | (C₂H₅)₂N—N=N—⟨⟩(CH₃)—CON(N₂) |
| (e) | H₂N—⟨⟩(OCH₃)—CONHNH₂ | ....do.... | (C₂H₅)₂N—N=N—⟨⟩(OCH₃)—CON(N₂) |
| (f) | ⟨naphthyl⟩(NH₂)—CONHNH₂ | ....do.... | ⟨naphthyl⟩(N=N—N(C₂H₅)₂)—CON(N₂) |
| (g) | H₂N—⟨⟩(CONHNH₂)(CONHNH₂) | Piperidine | (CH₂)₅N—N=N—⟨⟩(CON(N₂))(CON(N₂)) |
| (h) | ⟨⟩(NH₂)—SO₂NHNH₂ | Diethylamine | ⟨⟩(N=N—N(C₂H₅)₂)—SO₂N(N₂) |
| (i) | ⟨⟩(NH₂)—SO₂NHNH₂ | ....do.... | ⟨⟩(N=N—N(C₂H₅)₂)—SO₂N(N₂) |

The following examples illustrate the preferred method for preparation of compounds of the present invention, which contain a diazoimino grouping, and an acyl hydrazide grouping. As indicated previously, in the preparation of compounds of this type, it is preferable to start with an amino substituted carboxylic acid ester or an acetamido benzene sulfonyl chloride:

EXAMPLE 4

33 g. ethyl p-aminobenzoate is dissolved in 500 cc. water and 50 cc. HCl (36.5% by vol.). To this solution, cooled to 0° C., is added under the surface 36 cc. sodium nitrite solution (38.5% by vol.) at 0–5° C. When diazotization is complete, after about ½ hour, the diazo, at 0–5° C., is added slowly to a cold solution of 10 g. dimethylamine in 100 cc. water. During the addition a slight alkalinity is maintained with sodium carbonate solution. After addition is complete, the reaction is held at 0–5° C. for about ½ hour with stirring. The precipitate is separated by filtration, washed well with cold water and air dried at a low temperature.

11 g. of the above prepared precipitate is treated with 17 cc. hydrazine hydrate (85%), for 24 hours. The charge is diluted with 17 cc. ethanol, filtered at 15° C., washed with cold water and air dried at a low temperature, preferably under a slight vacuum.

The reaction follows the general method:

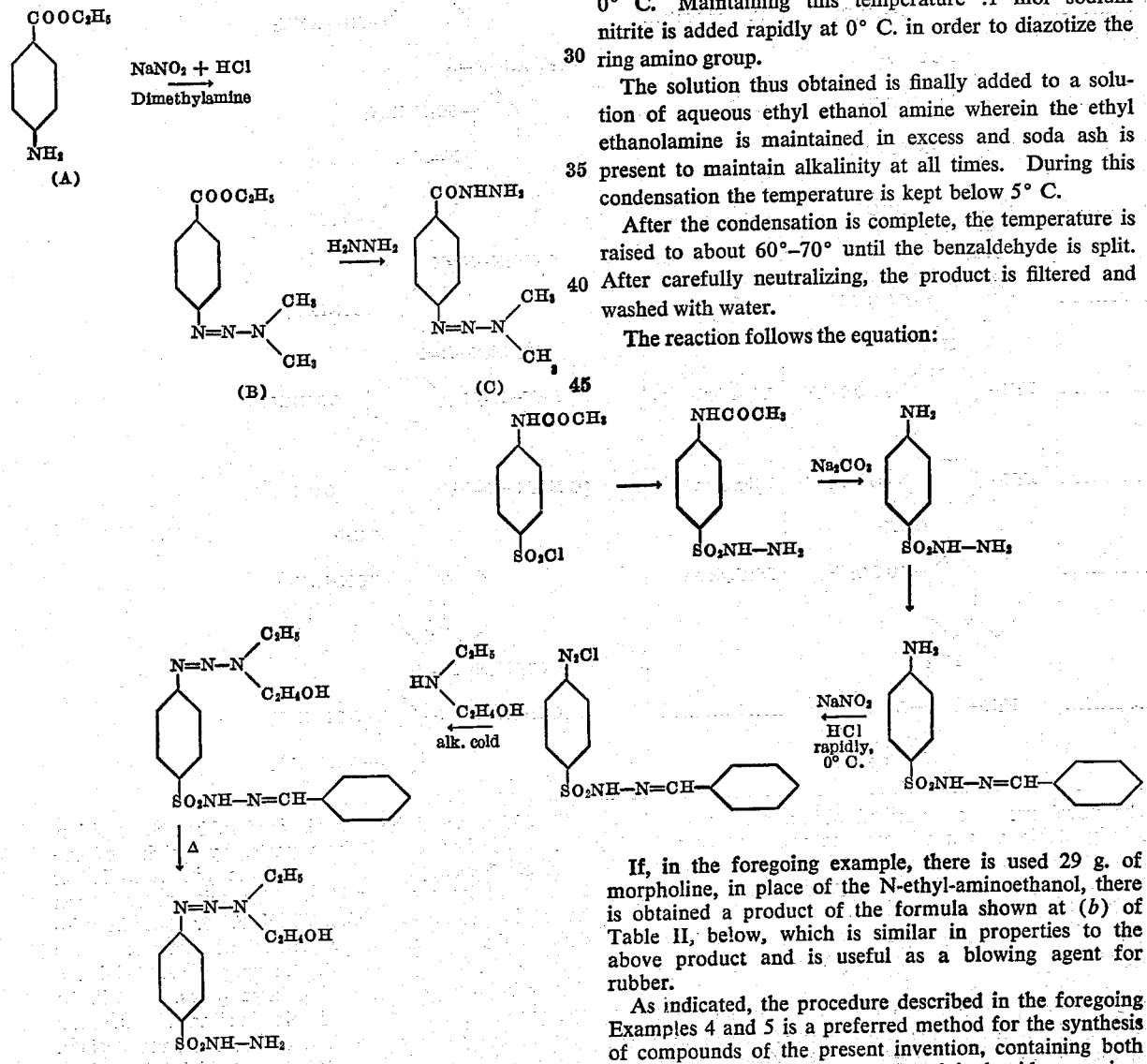

If, in the foregoing example, 36 g. of ethyl-p-amino-o-methyl benzoate is used in place of the ethyl-p-amino benzoate, there is obtained a product of the formula shown at (g), of Table II, below, which is similar in properties to the above product and is useful as a blowing agent for rubber.

EXAMPLE 5

.1 mol p-acetamidobenzenesulfon chloride is condensed as usual with hydrazine to form p-acetamidobenzenesulfon hydrazide. The acetyl group of this compound is then split off by heating in aqueous sodium carbonate solution to form p-aminobenzenesulfon hydrazide.

.1 mol of this latter compound is then condensed with .1 mol benzaldehyde in acetic acid as solvent at low temperature under which conditions only the hydrazine group (not the ring amine) condenses with the benzaldehyde.

After condensation is complete, .15 mol HCl as a 35% solution is added and the mixture cooled to −5° C. to 0° C. Maintaining this temperature .1 mol sodium nitrite is added rapidly at 0° C. in order to diazotize the ring amino group.

The solution thus obtained is finally added to a solution of aqueous ethyl ethanol amine wherein the ethyl ethanolamine is maintained in excess and soda ash is present to maintain alkalinity at all times. During this condensation the temperature is kept below 5° C.

After the condensation is complete, the temperature is raised to about 60°–70° until the benzaldehyde is split. After carefully neutralizing, the product is filtered and washed with water.

The reaction follows the equation:

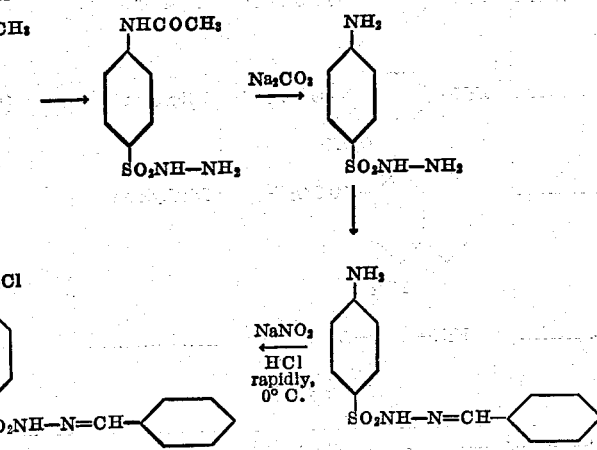

If, in the foregoing example, there is used 29 g. of morpholine, in place of the N-ethyl-aminoethanol, there is obtained a product of the formula shown at (b) of Table II, below, which is similar in properties to the above product and is useful as a blowing agent for rubber.

As indicated, the procedure described in the foregoing Examples 4 and 5 is a preferred method for the synthesis of compounds of the present invention, containing both a diazoimino grouping and an acyl hydrazide grouping; and there is illustrated in tabular form (Table II), below, a variety of other products of this type (column C in the table), which may be prepared by the foregoing procedure, using, in place of the ethyl-p-aminobenzoate, of Example 4, or the acetamidobenzene sulfonyl chloride of Example 5, an equivalent amount of an ester of the amino substituted benzene carboxylic acid or acetamidobenzene sulfonyl chloride indicated in column A of the table, and/or an equivalent amount of the secondary amine indicated in column B of the table, in place of the dimethylamine of Example 4, or the N-ethylaminoethanol of Example 5.

a homogeneous mass was formed; i. e., from 15 minutes to 3 hours.

| | Grams |
|---|---|
| Pale crepe rubber | 259.5 |
| Blanc fixe | 169.5 |
| Whiting | 90.0 |
| Zinc oxide | 30.0 |
| Sulfur | 6.0 |
| 90% rubber+10% benzodithiazyl disulfide | 37.5 |
| 90% rubber+10% zinc dimethyl-dithiocarbamate | 7.5 |
| Titanium dioxide | 24.0 |

Table II

| | A<br>Aminocarboxylic acid ester or Acetamido benzene sulfonyl chloride | B<br>Amine | C<br>Product |
|---|---|---|---|
| (a) | HN(COCH$_3$)-C$_6$H$_4$-SO$_2$Cl | Piperidine | (CH$_2$CH$_2$)$_2$(CH$_2$)N—N=N—C$_6$H$_4$—SO$_2$NHNH$_2$ |
| (b) | HN(COCH$_3$)-C$_6$H$_4$-SO$_2$Cl | Morpholine | O(C$_2$H$_4$)$_2$N—N=N—C$_6$H$_4$—SO$_2$NHNH$_2$ |
| (c) | C$_6$H$_4$(NHCOCH$_3$)-SO$_2$Cl | Diethylamine | (C$_2$H$_5$)$_2$N—N=N—C$_6$H$_4$—SO$_2$NHNH$_2$ |
| (d) | C$_6$H$_4$(NHCOCH$_3$)-SO$_2$C$_2$H$_5$ | do | C$_6$H$_4$(SO$_2$NHNH$_2$)—N=N—N—(C$_2$H$_5$)$_2$ |
| (e) | C$_6$H$_4$(NH$_2$)-COOC$_2$H$_5$ | do | (C$_2$H$_5$)$_2$N—N=N—C$_6$H$_4$—CONHNH$_2$ |
| (f) | C$_6$H$_4$(NH$_2$)-COOC$_3$H$_7$ | do | (C$_2$H$_5$)$_2$N—N=N—C$_6$H$_4$—CONHNH$_2$ |
| (g) | H$_2$N-C$_6$H$_3$(CH$_3$)-COOC$_2$H$_5$ | Dimethylamine | (CH$_3$)$_2$N—N=N—C$_6$H$_3$(CH$_3$)—CONHNH$_2$ |
| (h) | H$_2$N-C$_6$H$_3$(OCH$_3$)-COOC$_2$H$_5$ | Dibutylamine | (C$_4$H$_9$)$_2$N—N=N—C$_6$H$_3$(OCH$_3$)—CONHNH$_2$ |
| (i) | C$_{10}$H$_6$(NH$_2$)-COOC$_2$H$_5$ | Diethylamine | (C$_2$H$_5$)$_2$N—N=N—C$_{10}$H$_6$—CONHNH$_2$ |
| (j) | H$_2$N-C$_6$H$_3$(COOC$_2$H$_5$)-COOC$_2$H$_5$ | do | (C$_2$H$_5$)$_2$N—N=N—C$_6$H$_3$(CONHNH$_2$)—CONHNH$_2$ |

The novel products described above, are as stated, relatively stable at normal temperatures, but may be decomposed under controlled conditions at elevated temperatures, and are, therefore, of particular interest for the production of foamed plastics. The use of these novel compounds as "blowing" agents for rubber, may be illustrated by the following example:

A

The following rubber composition was made up by combining the following ingredients in the usual manner on a rubber mill, at a temperature of 70°–80° F. until To 100 parts of the thus obtained rubber composition there was then added three parts, by weight, of the product of Example I, above, and the mixture milled at 70–80° F. until well mixed. The mixture was then heated in a dry oven at about 220° F. for about 20 minutes. When so tested, the product of Example 1 was found to be very active as a "blowing" agent, giving a porous rubber product having large pores. It will be apparent that the amount of "blowing" agent which can be combined with the rubber, or other organo plastics, may range from .5% up to 5%, or even higher by weight, based on the content of rubber or other organo plastics and depending upon the type of article being produced.

It is not intended to confine the use of the compounds of the present invention to expanding natural rubber, since it can be applied to other organo plastics, and mixtures thereof, such as are shown in U. S. Patent No. 2,448,154, namely, alkyd resins, urea-formaldehyde resins, polymerized unsaturated materials such as polyacrylonitrile, polystyrene, polyvinyl chloride, copolymers of vinyl chloride and vinyl acetate, amorphous non-resinous plastic materials such as cellulose esters, cellulose ethers, synthetic rubbers such as polyisocyanates and the rubbery copolymers of butadiene and styrene or acrylonitrile, rubbery copolymers of isobutylene and butadiene or isoprene polychloroprene, polyisobutylene, olefin polysulfides, etc.

We claim:

1. Compounds of the formula

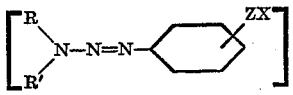

wherein

represents the residue of a secondary amine of the type used for stabilizing diazonium salts and selected from the group consisting of secondary heterocyclic amines and secondary saturated lower aliphatic amines in which the carbon chains contain 1 to 4 carbon atoms, Z represents a member of the group consisting of —CO— and —SO₂— groups, and X represents a member of the group consisting of —NHNH₂ and

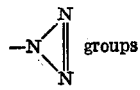 groups

2. Compounds of the formula

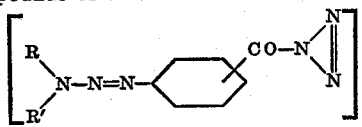

wherein the group

represents the residue of a secondary amine of the type used for stabilizing diazonium salts and selected from the group consisting of secondary heterocyclic amines and secondary saturated lower aliphatic amines in which the carbon chains contain 1 to 4 carbon atoms.

3. Compounds of the formula

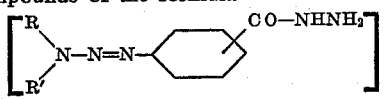

wherein the group

represents the residue of a secondary amine of the type used for stabilizing diazonium salts and selected from the group consisting of secondary heterocyclic amines and secondary saturated lower aliphatic amines in which the carbon chains contain 1 to 4 carbon atoms.

4. Compounds of the formula

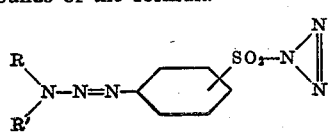

wherein the group

represents the residue of a secondary amine of the type used for stabilizing diazonium salts and selected from the group consisting of secondary heterocyclic amines and secondary saturated lower aliphatic amines in which the carbon chains contain 1 to 4 carbon atoms.

5. Compounds of the formula

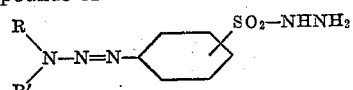

wherein the group

represents the residue of a secondary amine of the type used for stabilizing diazonium salts and selected from the group consisting of secondary heterocyclic amines and secondary saturated lower aliphatic amines in which the carbon chains contain 1 to 4 carbon atoms.

6. Compounds of the formula

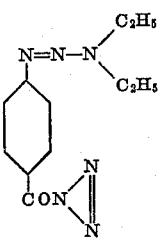

7. Compounds of the formula

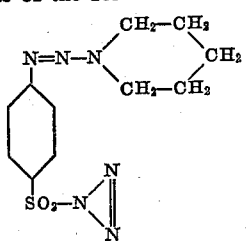

8. Compounds of the formula

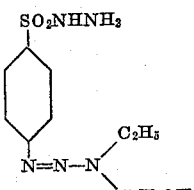

9. Compounds of the formula

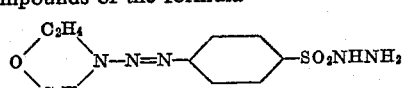

10. Compounds of the formula

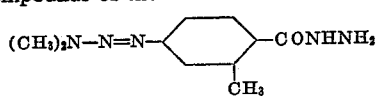

References Cited in the file of this patent

UNITED STATES PATENTS 2,518,249   Ott     Aug. 8, 1950
2,741,624   Hunter     Apr. 10, 1956

OTHER REFERENCES

Henry et al.: J. A. C. S., March 1943, p. 479.